US007136741B2

(12) United States Patent
Hosoya et al.

(10) Patent No.: US 7,136,741 B2
(45) Date of Patent: Nov. 14, 2006

(54) APPARATUS AND METHOD FOR CONTROLLING VEHICLE

(75) Inventors: Hajime Hosoya, Kanagawa (JP); Masahiko Wakairo, Kanagawa (JP)

(73) Assignee: Hitachi, Ltd., Tokyo-to (JP)

( * ) Notice: Subject to any disclaimer, the term of this patent is extended or adjusted under 35 U.S.C. 154(b) by 0 days.

(21) Appl. No.: 10/953,383

(22) Filed: Sep. 30, 2004

(65) Prior Publication Data

US 2005/0125138 A1 Jun. 9, 2005

(30) Foreign Application Priority Data

Oct. 16, 2003 (JP) ............................ 2003-356892

(51) Int. Cl.
*G01M 15/04* (2006.01)

(52) U.S. Cl. ...................................... 701/112; 701/114

(58) Field of Classification Search .................... None
See application file for complete search history.

(56) References Cited

U.S. PATENT DOCUMENTS

| | | | | |
|---|---|---|---|---|
| 2003/0084711 | A1* | 5/2003 | Kano et al. | 73/118.1 |
| 2004/0030487 | A1* | 2/2004 | Streib | 701/114 |
| 2004/0123845 | A1* | 7/2004 | Nishioka et al. | 123/520 |
| 2004/0267437 | A1* | 12/2004 | Hosoya et al. | 701/112 |

FOREIGN PATENT DOCUMENTS

JP 2003-13810 A 1/2003

* cited by examiner

*Primary Examiner*—Andrew M. Dolinar
(74) *Attorney, Agent, or Firm*—Foley & Lardner LLP

(57) ABSTRACT

When an operation of internal combustion engine is stopped, the power consumption of a control unit is lowered, to measure an elapsed time. When the elapsed time reaches a standby time, the processing of lowering the power consumption is cancelled, to diagnose whether or not the leakage occurs in an evaporation purge line of a fuel vapor processing apparatus.

8 Claims, 6 Drawing Sheets

APPARATUS AND METHOD FOR CONTROLLING VEHICLE

FIELD OF THE INVENTION

The present invention relates to an apparatus and a method for controlling a vehicle, and in particular, to a control apparatus and a control method for performing a previously determined control after a standby time has elapsed from an engine operation was stopped.

RELATED ART

Japanese Unexamined Patent Publication No. 2003-013810 discloses a diagnosis apparatus for diagnosing whether or not the leakage occurs in an evaporation purge line of a fuel vapor processing apparatus.

In this diagnosis apparatus, the evaporation purge line is shielded after an engine operation has been stopped, and it is diagnosed whether or not the leakage occurs in the evaporation purge line, based on a driving load of an air pump at the time when the air pump supplies air to the evaporation purge line.

If the fuel vapor is generated when the evaporation purge line is being pressurized, since a pressure in the evaporation purge line is changed by an influence of the fuel vapor generation, the accuracy of leakage diagnosis is lowered.

Therefore, it is preferable to standby until the fuel vapor is no longer generated after the engine operation has been stopped, and then to perform the leakage diagnosis.

However, the power generation is stopped during the stop of engine operation. Therefore, if a standby time until the start of the leakage diagnosis is made longer, a battery is wasted due to the power consumption by a control unit during the standby time, and consequently, it becomes hard to start the next engine operation.

SUMMARY OF THE INVENTION

The present invention has an object to suppress the battery waste during an engine operation is stopped, in a system for controlling the leakage diagnosis or the like after a standby time has elapsed after the engine operation was stopped.

In order to achieve the above object, according to the present invention, a control unit measures an elapsed time after an engine operation has been stopped, and when the elapsed time reaches a standby time, performs a previously determined control and also executes the processing of lowering the power consumption during the standby time.

The other objects and features of this invention will become understood from the following description with reference to the accompanying drawings.

DESCRIPTION OF EMBODIMENTS

Figure 1:
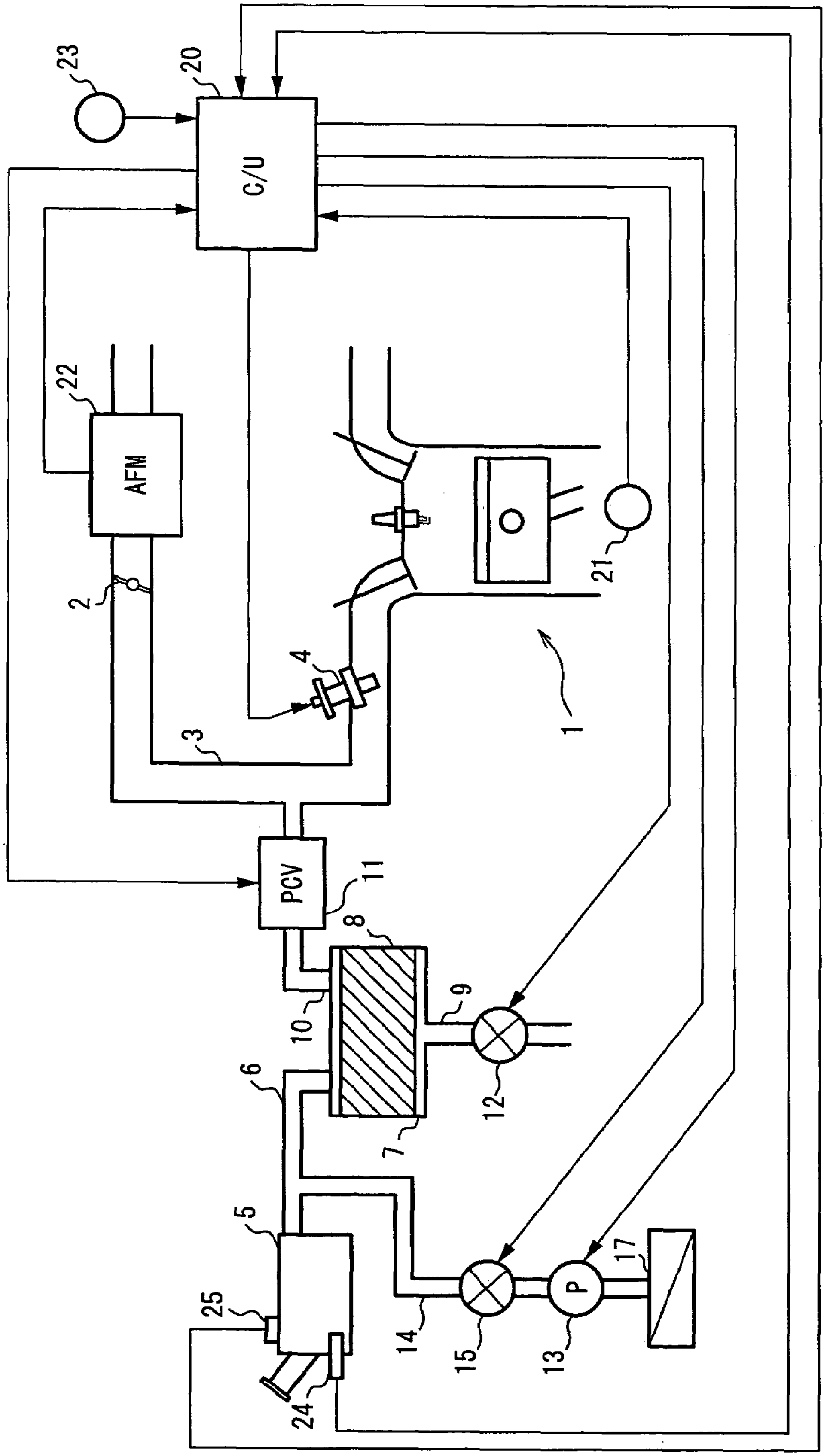
FIG. 1 is a diagram showing a system configuration of an internal combustion engine in an embodiment.

FIG. 1 shows a system configuration of an internal combustion engine in an embodiment.

In FIG. 1, an internal combustion engine 1 is a gasoline engine installed in a vehicle (not shown in the figure).

A throttle valve 2 is disposed in an intake pipe 3 of internal combustion engine 1.

For each cylinder, a fuel injection valve 4 is disposed on the downstream side of throttle valve 2.

Fuel injection valve 4 is opened based on an injection pulse signal output from a control unit 20.

Internal combustion engine 1 is provided with a fuel vapor processing apparatus.

The fuel vapor processing apparatus is for adsorbing and trapping the fuel vapor generated in a fuel tank 5 to a canister 7 via a fuel vapor inlet passage 6, and for supplying to internal combustion engine 1 the fuel vapor adsorbed and trapped to canister 7, to be burned.

Canister 7 is a container filled with the adsorbent 8 such as activated carbon.

Further, a new air inlet 9 is formed to canister 7, and a purge passage 10 is led out from canister 7.

Purge passage 10 is connected to intake pipe 3 on the downstream side of throttle valve 2 via a purge control valve (PCV) 11.

Purge control valve 11 is opened based on a purge control signal output from control unit 20.

When a purge permission condition is established during an operation of internal combustion engine 1, control unit 20 controls purge control valve 11 to open.

When purge control valve 11 is controlled to open, an intake negative pressure of internal combustion engine 1 acts on canister 7, so that the fuel vapor adsorbed to canister 7 is detached together with the fresh air.

Purged gas inclusive of the fuel vapor passes through purge passage 10 to be sucked into intake pipe 3.

Control unit 20 incorporates therein a microcomputer comprising a CPU, a ROM, a RAM, an A/D converter and an input/output interface.

Control unit 20 receives detection signals from various sensors.

As the various sensors, there are provided a crank angle sensor 21 outputting a crank angle signal, an air flow meter (AFM) 22 measuring an intake air flow amount, a vehicle speed sensor 23 detecting a vehicle speed, a pressure sensor 24 detecting a pressure in fuel tank 5, and a fuel level sensor 25 detecting a fuel level in fuel tank 5.

Figure 2:
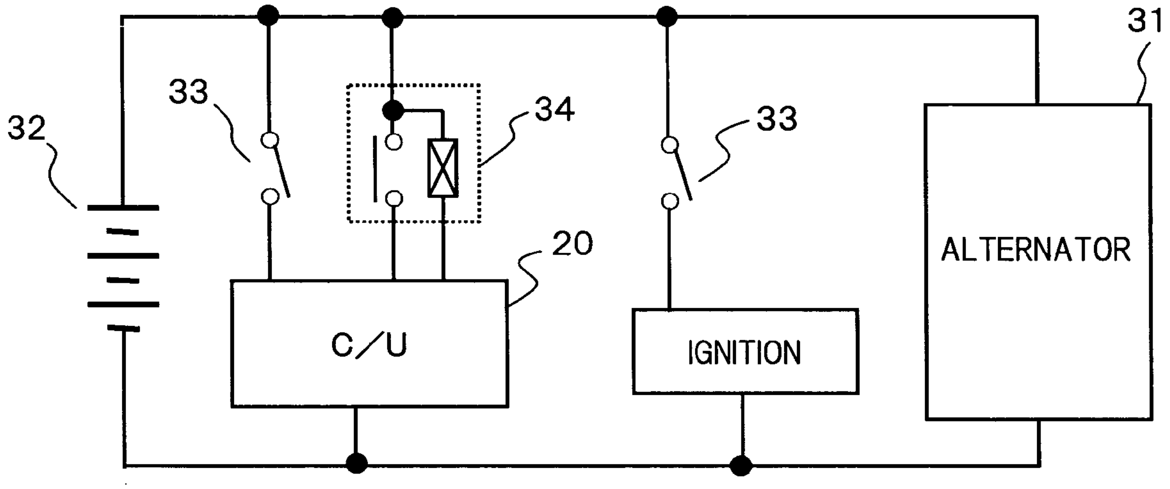
FIG. 2 is a circuit diagram of a control unit in a first embodiment.

Further, as shown in FIG. 2, there is disposed an alternator 31 which is driven by internal combustion engine 1.

Alternator 31 supplies the power to an electric load of the vehicle and also charges a battery 32.

Control unit 20 is connected to battery 32 via a key switch 33, and also is connected to battery 32 via a relay 34 the ON/OFF of which is controlled by control unit 20.

Here, control unit 20 performs the leakage diagnosis in an evaporation purge line of the fuel vapor processing apparatus after an operation of internal combustion engine 1 has been stopped.

For performing the leakage diagnosis, a drain cut valve 12 for opening/closing new air inlet 9 is disposed and also an air pump 13 for forcing air into fuel vapor inlet passage 6 is disposed.

Note, it is possible to perform the leakage diagnosis by depressurizing the evaporation purge line, instead of the pressurization of the evaporation purge line by air pump 13.

A discharge port of air pump 13 is connected to fuel vapor inlet passage 6 via an air supply pipe 14.

A check valve 15 is disposed in the halfway of air supply pipe 14.

Further, an air cleaner 17 is disposed on the inlet port side of air pump 13.

When a diagnosis condition is established after the operation of internal combustion engine 1 has been stopped, control unit 20 controls purge control valve 11 and drain cut valve 12 to close.

As a result, the evaporation purge line inclusive of fuel tank 5, fuel vapor inlet passage 6, canister 7 and purge passage 10 on the upstream of purge control valve 11, is shielded.

Next, control unit 20 supplies the air to the shielded evaporation purge line by air pump 13, to diagnose whether or not the leakage occurs in the evaporation purge line, based on the pressure in fuel tank 5 or a driving load of air pump at the time.

Note, the details of the leakage diagnosis are not limited to the above constitution.

Figure 3:
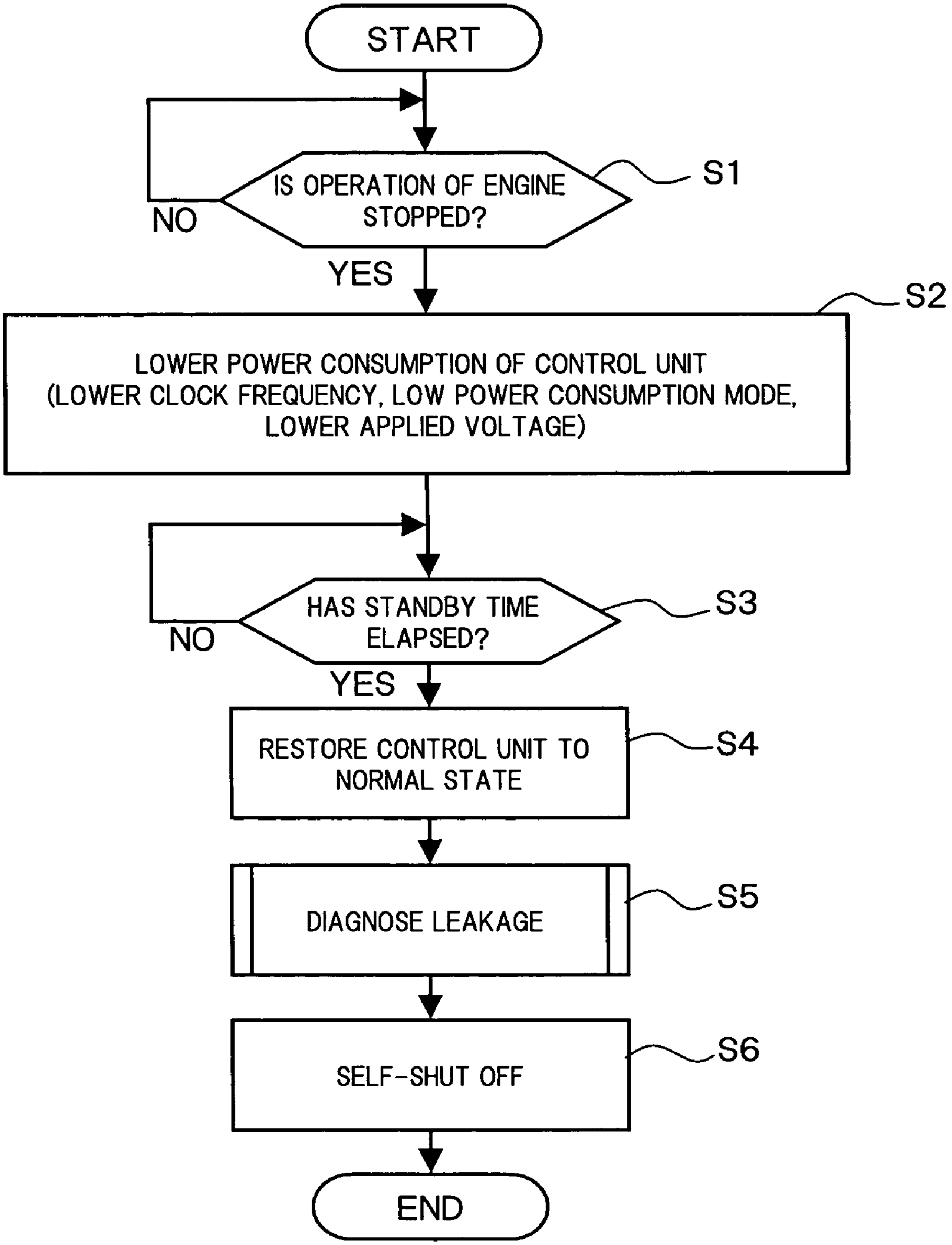
FIG. 3 is a flowchart showing the leakage diagnosis in the first embodiment.

FIG. 3 shows a leakage diagnosis control by control unit 20.

In step S1, it is judged whether or not the operation of internal combustion engine 1 is stopped by a key operation.

If the operation of internal combustion engine 1 is stopped, control proceeds to step S2, where the processing of lowering the power consumption in control unit 20 is performed.

To be specific, there is executed at least one of the processing of lowering a clock frequency of the CPU, the processing of shifting control unit 20 from a normal mode to a sleeping mode and the processing of lowering a power supply voltage for control unit 20 within an operation assurance range.

In step S3, it is judged whether or not a standby time until the start of the leakage diagnosis has elapsed, and a state where the power consumption is lowered is kept until the lapse of the standby time is judged.

Figure 4:
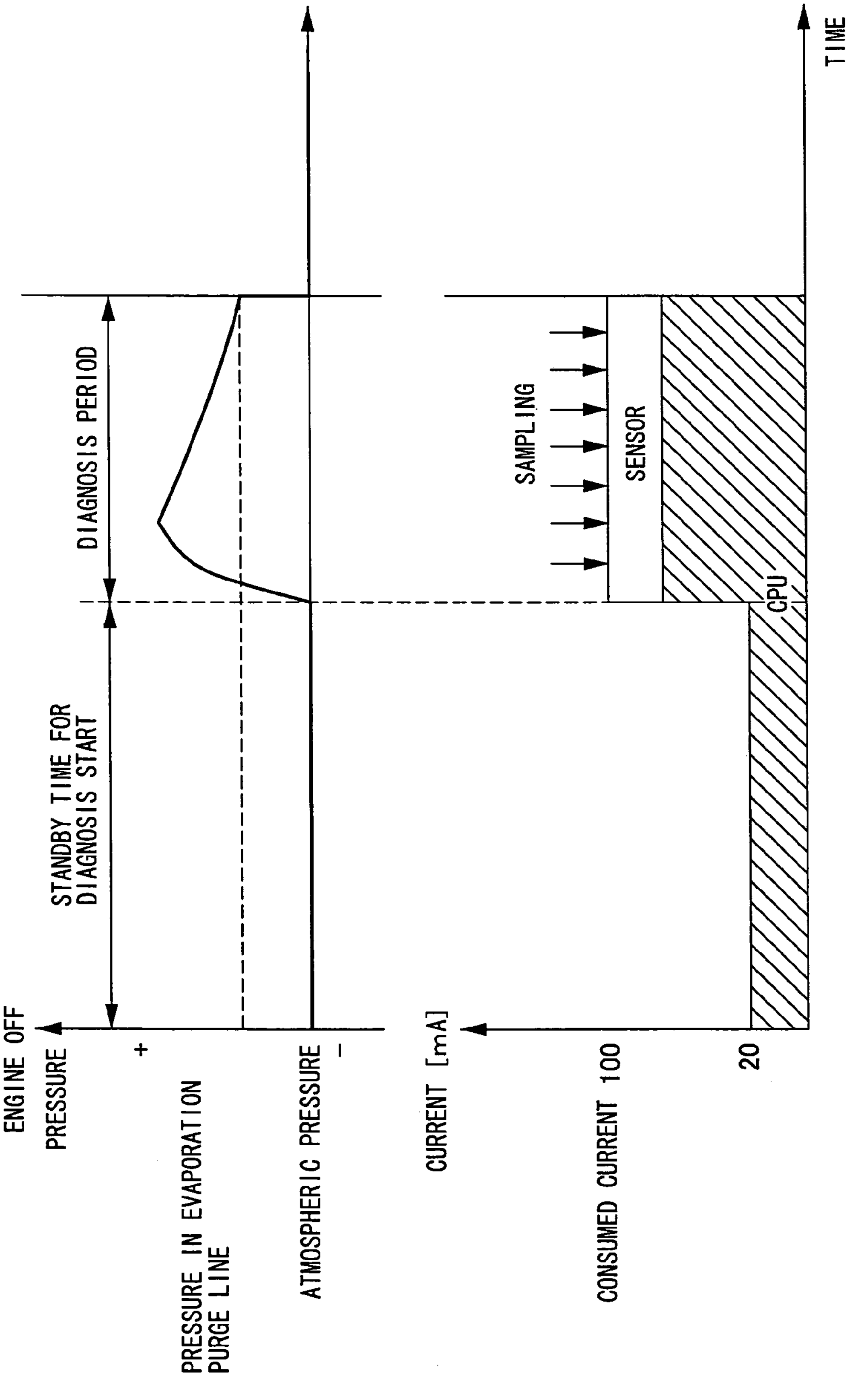
FIG. 4 is a time chart showing a characteristic of the power consumption in the first embodiment.

Accordingly, during a period of time until the standby time has elapsed after the operation of internal combustion engine 1 was stopped, control unit 20 measures the elapsed time under a state where the power consumption is less than that in a normal state (refer to FIG. 4).

Therefore, even if the standby time until the start of the leakage diagnosis is long, the waste of battery 32 during the standby time can be avoided.

The standby time may be a previously stored fixed time, but is preferably to be changed according to operating conditions in order to start the leakage diagnosis immediately after the generation of fuel vapor is stopped.

An operation history of internal combustion engine 1 before the operation thereof is stopped, a temperature of internal combustion engine 1 at the time when the operation of internal combustion engine 1 is stopped, a fuel temperature, the pressure in fuel tank 5 or evaporation purge line, the fuel level and the like, are detected as the operating conditions, and then, the standby time is changed based on these detected operating conditions.

Further, times until the pressure of internal combustion engine 1, the fuel temperature and the pressure in fuel tank 5 or the evaporation purge line reach thresholds, respectively, can be set to the standby time.

If the standby time has elapsed, control proceeds to step S4.

In step S4, the processing of lowering the power consumption of control unit 20 executed in step S2 is cancelled, to return to the normal power consumption state.

Then, in next step S5, the leakage diagnosis is executed.

In the leakage diagnosis, at first, purge control valve 11 and drain cut valve 12 are controlled to close, so that the evaporation purge line inclusive of fuel tank 5, fuel vapor inlet passage 6, canister 7 and purge passage 10 on the upstream of purge control valve 11, is shielded.

Next, the air is supplied to the evaporation purge line by air pump 13.

Then, if the pressure in fuel tank 5 or the driving load of air pump 13 reaches the threshold or above within a fixed time after the start of air supply by air pump 13, it is judged that no leakage occurs.

On the other hand, if the pressure in fuel tank 5 or the driving load of air pump 13 does not reach the threshold within the fixed time, it is judged that the leakage occurs.

Note, it is possible to perform the leakage diagnosis based on a rise speed and/or a rise rate of the pressure in fuel tank 5 or the driving load of air pump 13.

Further, it is possible to perform the leakage diagnosis based on a decreasingly change amount of the pressure in a fixed time after the stop of pressurization by air pump 13, a time necessary for the pressure to be lowered to the threshold, or the like.

If the leakage diagnosis is finished, control proceeds to step S6, where control unit 20 controls the relay 34 to self-shut off the power source.

Figure 5:
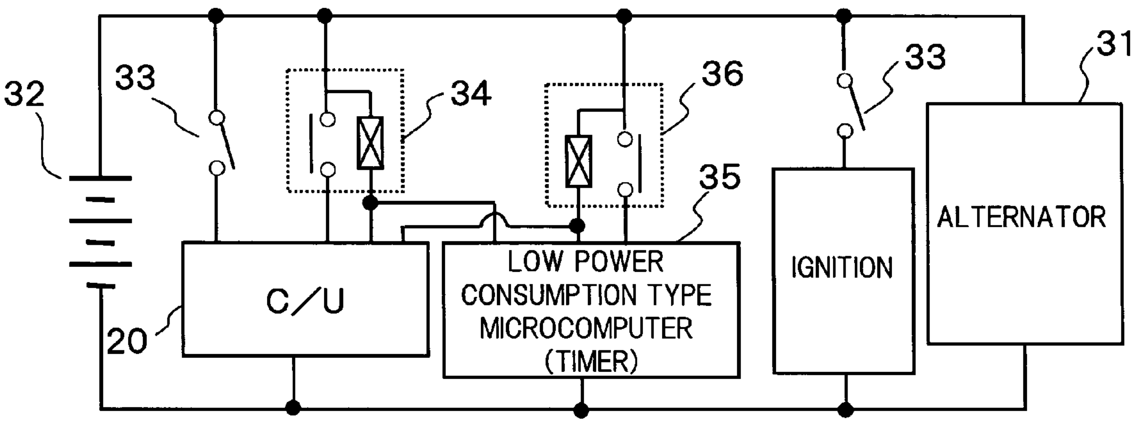
FIG. 5 is a circuit diagram of the control unit in a second embodiment.

FIG. 5 shows control unit 20 and a peripheral circuit thereof in a second embodiment.

In the second embodiment, there is disposed a timer apparatus 35 provided with a function for measuring the standby time and also a function for activating control unit 20 at the time when the lapse of standby time is measured.

Timer apparatus 35 is a microcomputer or a timer apparatus of low power consumption type, whose power consumption is less than that of control unit 20.

Timer apparatus 35 is supplied with a battery voltage via a relay 36 which is turned ON or OFF based on a signal from timer apparatus 35.

Further, timer apparatus 35 includes a function for controlling the ON/OFF of relay 34 disposed between control unit 20 and battery 32.

Note, relay 36 is also controlled to be turned ON or OFF by control unit 20.

Figure 6:
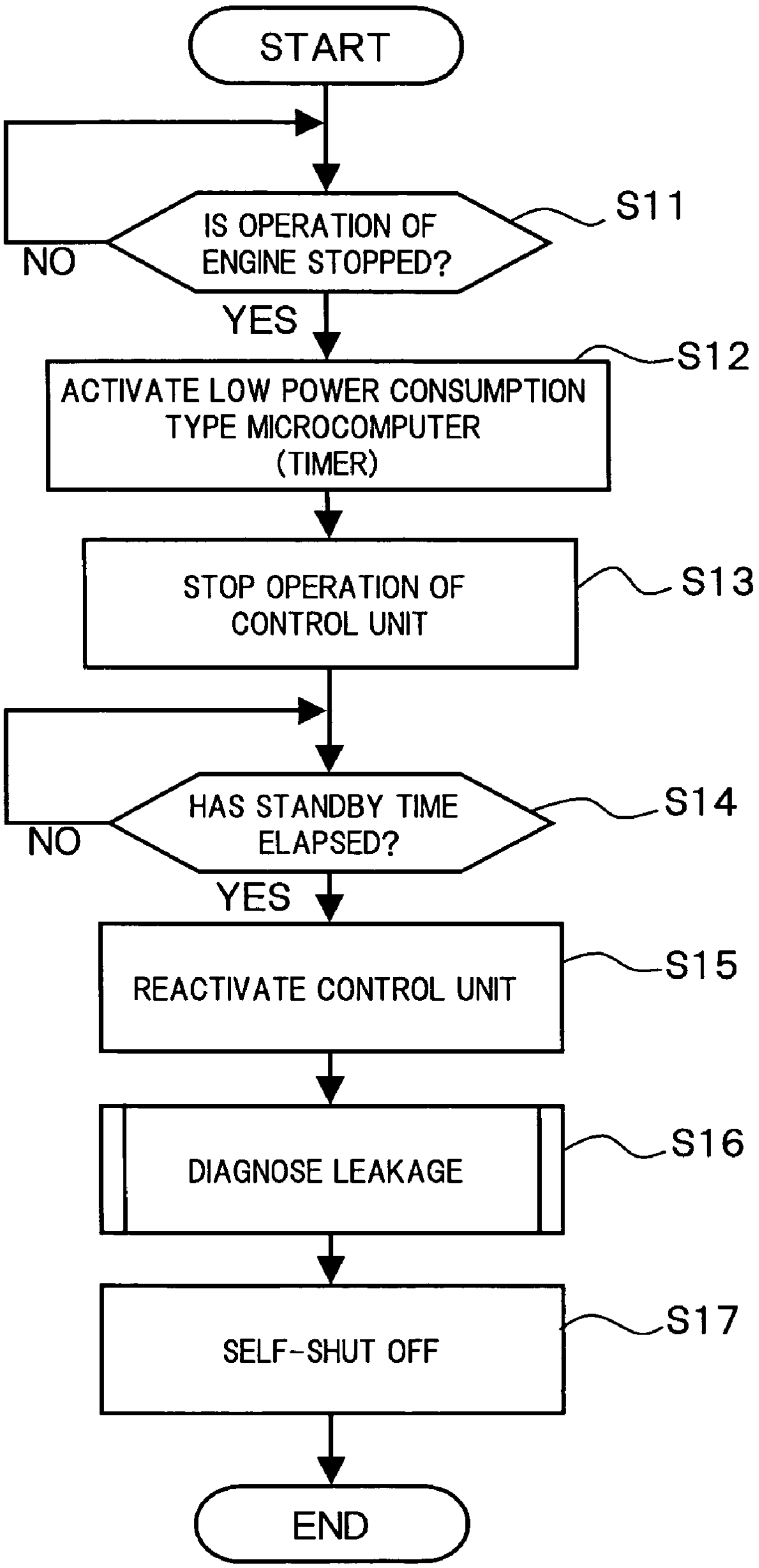
FIG. 6 is a flowchart showing the leakage diagnosis in the second embodiment.

Then, in the second embodiment, the leakage diagnosis is performed as shown in a flowchart of FIG. 6.

In step 11, it is judged whether or not the operation of internal combustion engine 1 is stopped by the key operation.

If the operation of internal combustion engine 1 is stopped, control proceeds to step S12.

In step S12, control unit 20 controls relay 36 to be turned ON, to activate timer apparatus 35, and also sets data of the standby time to timer apparatus 35.

Note, in the case where the microcomputer of low power consumption type is used as timer apparatus 35, it is possible that the detection signals from the various sensors are input to timer apparatus 35, so that timer apparatus 35 determines the standby time based on the detection signals.

Next, in step S13, control unit 20 controls relay 34 to be turned OFF, to self-shut off the power source.

In step S14, it is detected by timer apparatus 35 whether or not the standby time has elapsed after the operation of internal combustion engine 1 was stopped.

Then, if the standby time has elapsed, in step S15, timer apparatus 35 controls relay 34 to be turned ON, so that the power is again supplied to control unit 20 to activate control unit 20.

According to the above constitution, an operation of control unit 20 is stopped during a period until the start of the leakage diagnosis after the operation of internal combustion engine 1 has been stopped, and instead, timer apparatus 35 whose power consumption is less than that of control unit 20 is operated to measure the standby time.

Accordingly, since the power consumption during the standby time is lowered, even if the standby time is made longer, the waste of battery can be avoided.

Timer apparatus 35 self-shuts off the power source immediately after control unit 20 is reactivated.

Note, the constitution may be such that the leakage diagnosis is performed by the cooperative control of control unit 20 and timer apparatus 35, and after the leakage diagnosis is finished, control unit 20 and timer apparatus 35 self-shut off the power sources, respectively.

If control unit 20 is reactivated in step S15, then in next step S16, control unit 20 performs the leakage diagnosis in the same manner as in step S5.

If the leakage diagnosis is finished, in step S17, control unit 20 self-shuts off the power source.

Note, in the case where the detection data of pressure is sampled at each fixed period during the leakage diagnosis, if the power consumption of control unit 20 is shifted to the sleeping mode to be reduced or the operation of control unit 20 is temporarily stopped using timer apparatus 35 between each sampling period, the power consumption during the leakage diagnosis can be reduced.

In the above embodiments, the control during the engine operation stop is the diagnosis of the leakage in the fuel vapor processing apparatus. However, it is apparent that such a control can be applied to other controls.

Further, the constitution may be such that, in addition to control unit 20 (main control unit), there is disposed a sub-control unit whose power consumption is less than that of control unit 20 (main control unit), so that the operation of control unit 20 (main control unit) is stopped at the time when the operation of internal combustion engine 1 is stopped, and the sub-control unit measures the standby time and performs the leakage diagnosis.

The entire contents of Japanese Patent Application No. 2003-356892 filed on Oct. 16, 2003, a priority of which is claimed, are incorporated herein by reference.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing description of the embodiments according to the present invention is provided for illustration only, and not for the purpose of limiting the invention as defined in the appended claims and their equivalents.

What is claimed is:

1. An apparatus for controlling a vehicle provided with an engine, comprising:

a control unit which measures an elapsed time after an operation of said engine is stopped, and performs a previously determined control when said elapsed time reaches a standby time, wherein said control unit executes the processing of lowering a power consumption during said standby time, wherein said control unit includes a CPU, and said control unit lowers a clock frequency of said CPU during said standby time, as said processing of lowering the power consumption, wherein said engine is provided with a fuel vapor processing apparatus, and the control executed by said control unit after said standby time has elapsed after the operation of said engine was stopped is a leakage diagnosis for diagnosing whether or not a leakage occurs in an evaporation purge line of said fuel vapor processing apparatus, wherein said control unit calculates a time until the generation of fuel vapor is stopped after the operation of said engine is stopped, as said standby time.

2. An apparatus for controlling a vehicle according to claim 1, wherein said control unit self-shuts off the power supply when completing the previously determined control after said standby time has elapsed.

3. A method for controlling a vehicle provided with an engine by a control unit, comprising the steps of:

measuring an elapsed time after an operation of said engine is stopped;

executing the processing of lowering a power consumption during the time said elapsed time is measured;

performing a previously determined control when said elapsed time reaches a standby time, wherein said step of executing the processing of lowering the power consumption lowers a clock freciuency, as said processing of lowering the power consumption, wherein said engine is provided with a fuel vapor processing apparatus, and wherein said step of performing the previously determined control when said elapsed time reaches the standby time diagnoses whether or not a leakage occurs in an evaporation purge line of said fuel vapor processing apparatus after said standby time has elapsed after the operation of said engine was stopped; and calculating a time until the generation of fuel vapor is stopped after the operation of said engine is stopped, as said standby time.

4. A method for controlling a vehicle according to claim 3, further comprising the step of;

self-shutting off the power supply when the previously determined control is completed after said standby time has elapsed.

5. An apparatus for controlling a vehicle provided with an engine, comprising:

a control unit which measures an elapsed time after an operation of said engine is stopped, and performs a previously determined control when said elapsed time reaches a standby time, wherein said control unit executes the processing of lowering a power consumption during said standby time, wherein said control unit shifts to a sleeping mode during said standby time, as said processing of lowering the power consumption, wherein said engine is provided with a fuel vapor processing apparatus, and the control executed by said control unit after said standby time has elapsed after the operation of said engine was stopped is a leakage diagnosis for diagnosing whether or not a leakage occurs in an evaporation purge line of said fuel vapor processing apparatus, wherein said control unit calculates a time until the generation of fuel vapor is stopped after the operation of said engine is stopped, as said standby time.

6. An apparatus for controlling a vehicle according to claim 5, wherein said control unit self-shuts off the power supply when completing the previously determined control after said standby time has elapsed.

7. A method for controlling a vehicle provided with an engine by a control unit, comprising the steps of:

measuring an elapsed time after an operation of said engine is stopped;

executing the processing of lowering a power consumption during the time said elapsed time is measured;

performing a previously determined control when said elapsed time reaches a standby time, wherein said step of executing the processing of lowering the power consumption shifts to a sleeping mode during said standby time, as said processing of lowering the power consumption, wherein said engine is provided with a fuel vapor processing apparatus, and said step of performing the previously determined control when said elapsed time reaches the standby time diagnoses whether or not a leakage occurs in an evaporation purge line of said fuel vapor processing apparatus after said standby time has elapsed after the operation of said engine was stopped; and calculating a time until the generation of fuel vapor is stopped after the operation of said engine is stopped, as said standby time.

8. A method for controlling a vehicle according to claim 7, further comprising the step of;

self-shutting off the power supply when the previously determined control is completed after said standby time has elapsed.

* * * * *